US012553672B1

(12) United States Patent
    Cottingham (10) Patent No.: US 12,553,672 B1
(45) Date of Patent: Feb. 17, 2026

(54) SPRAY-ACTUATED HEAT ENGINE

(71) Applicant: Brent R. Cottingham, Grand Rapids, MI (US)

(72) Inventor: Brent R. Cottingham, Grand Rapids, MI (US)

( * ) Notice: Subject to any disclaimer, the term of this patent is extended or adjusted under 35 U.S.C. 154(b) by 126 days.

(21) Appl. No.: 18/643,125

(22) Filed: Apr. 23, 2024

Related U.S. Application Data

(60) Provisional application No. 63/498,034, filed on Apr. 25, 2023.

(51) Int. Cl.
    *F28D 20/00* (2006.01)
(52) U.S. Cl.
    CPC .. *F28D 20/0034* (2013.01); *F28D 2020/0069* (2013.01); *F28D 2020/0082* (2013.01)
(58) Field of Classification Search
    CPC ......... F28D 20/0034; F28D 2020/0069; F28D 2020/0082
    USPC ....................................................... 165/165
    See application file for complete search history.

(56) References Cited

U.S. PATENT DOCUMENTS

| 10,809,014 B1 * | 10/2020 | Harpole | F28D 20/0034 |
| 11,543,191 B1 * | 1/2023 | McBride | F03G 6/004 |
| 11,578,693 B1 * | 2/2023 | McBride | F28D 20/0039 |

* cited by examiner

*Primary Examiner* — Steve S Tanenbaum
(74) *Attorney, Agent, or Firm* — Gardner, Linn, Burkhart & Ondersma LLP (57) ABSTRACT

A spray-actuated heat engine comprises an expandable volume chamber containing an operating fluid in gas form, a reservoir holding a heat transfer fluid in liquid form, a pump that pumps the heat transfer fluid from the reservoir to the chamber, and a piping system through which the heat transfer fluid is configured to flow. The piping system is in fluid communication with a heat source for heating the heat transfer fluid to obtain a high temperature and is in fluid communication with a cold source for removing heat from the heat transfer fluid to obtain a low temperature. The heat transfer fluid at the high temperature is selectively sprayed into the expandable volume to mix with and expand the operating fluid, and the heat transfer fluid at the low temperature is selectively sprayed into the expandable volume to mix with and contract the operating fluid.

25 Claims, 10 Drawing Sheets

SPRAY-ACTUATED HEAT ENGINE

CROSS REFERENCE TO RELATED APPLICATION

The present application claims priority of U.S. provisional application Ser. No. 63/498,034 filed Apr. 25, 2023, which is hereby incorporated herein by reference in its entirety

BACKGROUND AND FIELD OF THE INVENTION

The present invention is directed to a spray-actuated heat engine that is operable in connection with several different thermodynamic cycles, including Stirling, Ericsson or Brayton cycles.

Stirling, Ericsson and Brayton cycles, when currently incorporated into mechanical devices producing power, utilize heat exchangers to add and remove energy from the working fluid. Stirling and Ericsson cycle devices add energy to the working fluid in hot and cold zones of the mechanism and utilize a heat exchanger to re-use a portion of the energy. Brayton cycle steam engines use a boiler and a condenser as energy addition and removal modalities, respectively.

Typically, heat exchangers comprise a heating or cooling fluid in a metallic circuit that is either heated or cooled by another fluid, depending on whether the heat exchanger is adding or removing energy. A working fluid is brought into contact with the circuit material and is heated or cooled. The energy transfer in a heat exchanger is generally via conduction, except in a steam engine where energy is communicated to the working fluid first by conduction when the fluid is a liquid and then via convection after evaporation for purposes of super-heating it. Convection heat transfer requires the working fluid to first contact the heating/cooling surface and then be removed from it. The energy transfer is reduced by the boundary layer formed between the surface and the working fluid. The boundary layer may be removed by inducing turbulence in the working fluid, generally by increasing its velocity near the surface or by convoluting the surface in some manner. Generally, the area of the surface heating or cooling the working fluid must be greatly enlarged to facilitate heat transfer, since such energy transfer is partially a function of surface area. Flow losses incurred in the working fluid are unavoidable.

SUMMARY OF THE INVENTION

The present invention provides a spray-actuated heat engine that avoids flow losses and boundary layer limitations by removing surface-related convection in a heat exchanger as the energy transfer modality for a heat transfer fluid. The working fluid, contained in an expandable volume, is alternately heated and cooled by spray-injection of this heat transfer fluid (HTF). The HTF is moved to hot and cold locations where it is allowed to loiter, under pressure, and is therefore heated or cooled primarily by conduction, rather than convection. When sprayed into the expandable volume, energy is transferred into the working fluid by convection, but the surface area of spray droplets is much larger compared to the surface area of a heat exchanger, so the resulting energy transfer is much more rapid and avoids pumping losses with the working fluid.

In an embodiment in accordance with aspects of the invention, a spray-actuated heat engine comprises an expandable volume chamber containing an operating fluid in gas form, a reservoir holding a heat transfer fluid in liquid form, a pump that pumps the heat transfer fluid from the reservoir to the chamber, and a piping system through which the heat transfer fluid is configured to flow. The piping system is in fluid communication with a heat source for heating the heat transfer fluid to obtain a high temperature and is in fluid communication with a cold source for removing heat from the heat transfer fluid to obtain a low temperature. The heat transfer fluid at the high temperature is selectively sprayed into the expandable volume to mix with and expand the operating fluid, and the heat transfer fluid at the low temperature is selectively sprayed into the expandable volume to mix with and contract the operating fluid.

In a particular arrangement, the piping system is configured to provide heat transfer fluid at a median temperature to the heat source to obtain the high temperature heat transfer fluid, and is configured to provide heat transfer fluid at the median temperature to the cold source to obtain the cold temperature heat transfer fluid.

In such an arrangement, the heat transfer fluid at the median temperature may be selectively sprayed into the expandable volume to mix with the operating fluid therein to selectively expand and contract the operating fluid. For example, the heat transfer fluid at the median temperature may be first sprayed into the expandable volume to initiate expansion of the operating fluid and then heat transfer fluid at the high temperature is sprayed into the expandable volume to continue expansion of the operating fluid. Correspondingly, heat transfer fluid at the median temperature may be first sprayed into the expandable volume to initiate contraction of the operating fluid and then heat transfer fluid at the low temperature sprayed into the expandable volume to continue contraction of the operating fluid.

In an alternative embodiment in accordance with further aspects of the invention, a spray-actuated heat engine comprises a plurality of expandable volume chambers that each contain an operating fluid and comprise at least a first chamber and a last chamber. The engine further includes a heat transfer fluid in the form of a liquid, a heat source configured to heat the heat transfer fluid and a cold source configured to extract heat from the heat transfer fluid, where the heat transfer fluid is configured to be selectively sprayed into the expandable volumes of the chambers at different temperatures to mix with the operating fluids therein to selectively expand and contract the operating fluids.

In one particular arrangement, heat transfer fluid at a first chamber median temperature is output from the first chamber with a portion being delivered to the heat source to be heated and at least a portion subsequently delivered and sprayed into at least the first chamber, and where heat transfer fluid at a last chamber median temperature is output from the last chamber with a portion being delivered to the cold source to extract heat from the heat transfer fluid and at least a portion subsequently delivered and sprayed into at least the last chamber.

In another particular arrangement each chamber discharges a respective median temperature heat transfer fluid with a portion of the discharged median temperature heat transfer fluid being delivered to the heat source to be heated to obtain a high temperature heat transfer fluid, and a portion of the discharged median temperature heat transfer fluid delivered to the cold source to extract heat and obtain a low temperature heat transfer fluid, with heat transfer fluid at the high temperature being selectively sprayed into the expandable volumes of the chambers to mix with the operating fluids therein to selectively expand the operating fluids and with heat transfer fluid at the low temperature being selectively sprayed into the expandable volumes to mix with the operating fluids therein to selectively contract the operating fluids.

Any of the spray-actuated heat engines may include one or more output drives that are driven by selective expansion and contraction of operating fluid. The engines may further comprise a spray system for spraying heat transfer fluid into the chambers. The spray systems may be configured as a nozzle, orifice or the like, and may atomize the heat transfer fluid when spraying into the chamber. The reservoirs may be in fluid communication with the chambers, with heat transfer fluid that is sprayed into a chamber subsequently collecting into the reservoir. The engines may further include fluid flow controls coupled to the piping system, such as for selectively inhibiting or enabling flow through the piping system. The piping system may include a hot passage in fluid communication with the heat source, a cold passage in fluid communication with the cold source, and a median temperature passage through which heat transfer fluid at the median temperature flows.

According to still further aspects of the invention, a method of generating power using a spray-actuated heat engine and a heat transfer fluid includes moving heat transfer fluid as a liquid through a heat source to reach a high temperature and moving heat transfer fluid as a liquid through a cold source to reach a low temperature, and includes spraying heat transfer fluid at the high temperature into an expandable volume containing an operating fluid to cause the operating fluid to expand, and spraying heat transfer fluid at the low temperature into the expandable volume to cause the operating fluid to contract.

The method may be used on systems having multiple expandable volumes that each include an operating fluid.

The spray-actuated heat engines in accordance with the present invention provide relatively rapid power by moving heat in and out of a liquid, which, when sprayed, provides superior heat transfer rates to an operating fluid configured as a gas. The ability to move a larger quantity of heat and at higher speeds results in greater power output.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
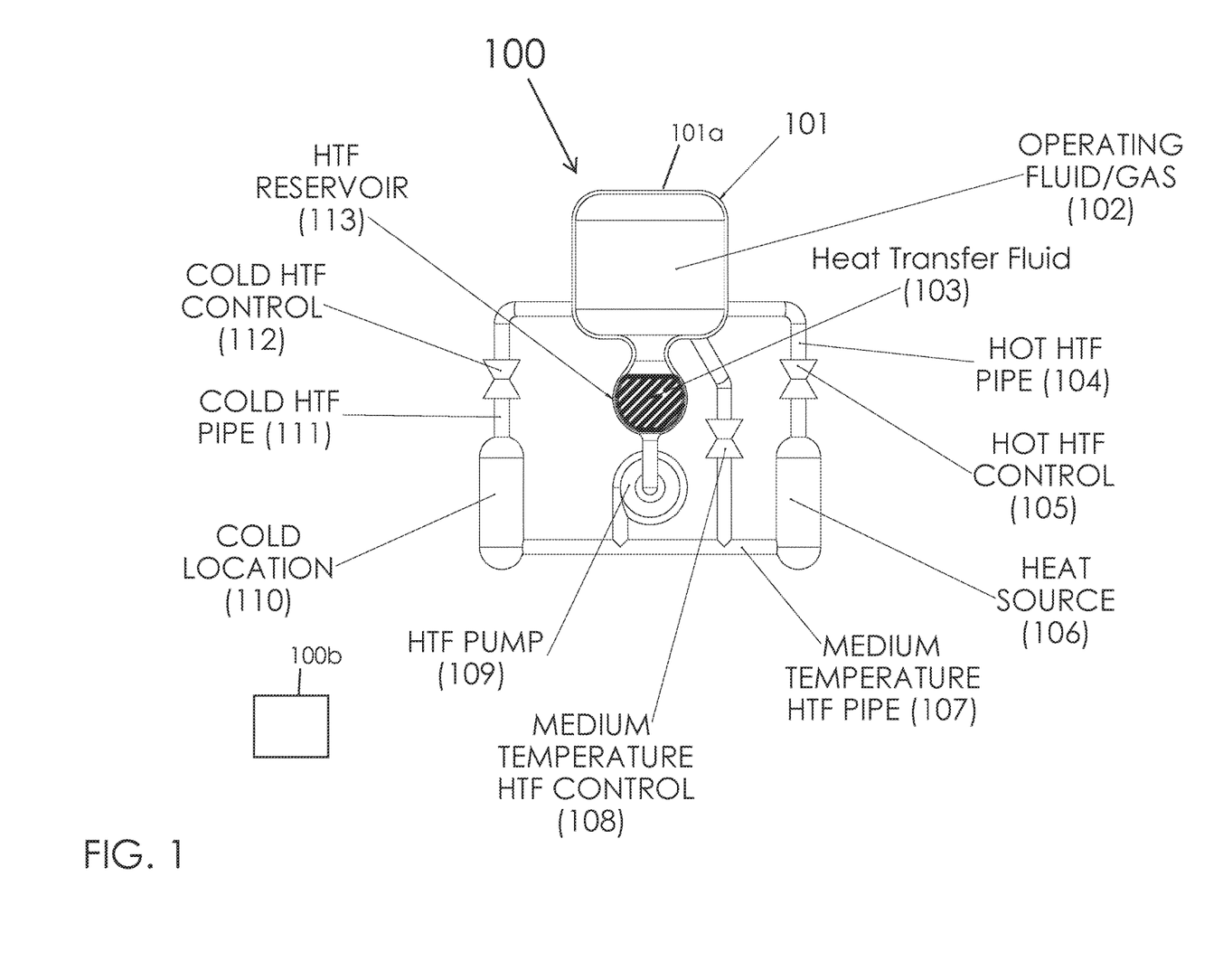
FIG. 1 is a schematic illustration of a spray-actuated system in accordance with an embodiment of the present invention.

FIG. 1 illustrates an idealized heat engine or spray-actuated system (SAS) 100 in accordance with aspects of the present invention. The SAS 100 is composed of a chamber 101a having an expandable volume 101, an operating fluid or gas 102, a heat transfer fluid 103, hot heat transfer fluid piping 104 with a valve or control or controller 105, a heat source 106 such as a hot sink or exchanger, a median or medium-temperature heat transfer fluid piping 107 with a valve or other controller 108, a heat transfer fluid pump 109, a cold location 110 such as a cold sink or exchanger, cold heat transfer fluid piping 111 with a valve or other controller 112 and a heat transfer fluid reservoir 113. A controller 100b configured as a computer or mechanical controller may selectively operate the valves 105, 108 and 112 to thereby control the flow of heat transfer fluid 103 that is sprayed into the expandable volume 101.

In contrast to a typical Stirling cycle, SAS 100 replaces the interstitial heat exchanger or regenerator of such a Stirling cycle with a heat transfer fluid 103 stored in a reservoir 113 and a spray system modality, discussed in more detail below. This removes the requirement to physically pump the operating gas 102 from one temperature location to another. The operating gas 102 is contained in the expandable volume 101, which expands with increases in gas pressure and contracts when pressure decreases. Expandable volume 101 comprises a control volume and may be configured as a piston-cylinder arrangement, a rotary arrangement, or other such control volume configured to provide an output of power. Heat energy is added or removed from the operating gas 102 by spraying different temperatures of heat transfer fluid 103 into the expandable volume 101. The heat transfer fluid 103 has three distinct temperature levels: maximum, median or medium and low. The maximum is a high temperature relative to the other temperature levels, the medium is a temperature level between the maximum and low levels, and the low level is a temperature that is lower than the others. The maximum level is set by circulating a portion of the heat transfer fluid 103 through the heat source 106, the low level by circulating a different portion of the heat transfer fluid 103 through the cold location 110 and the medium temperature occurs when the two extreme heat transfer fluid 103 portions are mixed in the heat transfer fluid reservoir 113. The heat transfer fluid 103 is moved about the system by a circulating pump 109. Fluid control is shown to be by individual control features 105, 108 and 112, which in the illustrated embodiment are configured as valves and which may be electronically or mechanically controlled or operated, such as by controller 100b.

Operation of SAS 100 will be further discussed in connection with FIGS. 2-5. With initial reference to FIG. 2, operation of SAS 100 as a Spray Stirling Cycle Engine begins with initial expansion 200 within expandable volume 101. The operating gas 102 is at its lowest temperature and the expandable volume 101 is also minimum. Medium-temperature heat transfer fluid 103 contained in the reservoir 113 is pumped by pump 109 through its open control 108 and sprayed 210 into the expandable volume 101 by a sprayer 211 such as an injector, or an ejector, or one or more orifices. The heat transfer fluid 103 is confined to this pathway 205 of the medium temperature piping 107 due to the alternate pathways through the hot piping 104 and cold piping 111 being closed by their respective controls 105 and 112. The spray 210 transfers heat to the operating gas 102, raising its temperature to nearly that of the medium-temperature heat transfer fluid 103 and increasing its pressure accordingly. Increased pressure of the operating gas 102 causes the expandable volume 101 to expand. During this expansion, the medium-temperature heat transfer fluid 103 is controlled in such a manner that the operating gas 102 temperature conforms to a desired level. For example, the medium-temperature heat transfer fluid 103 may be provided in a controlled rate, such as by spraying, such that the resulting temperature of the operating gas 102 is in turn controlled at a desired temperature or temperatures.

Figure 2:
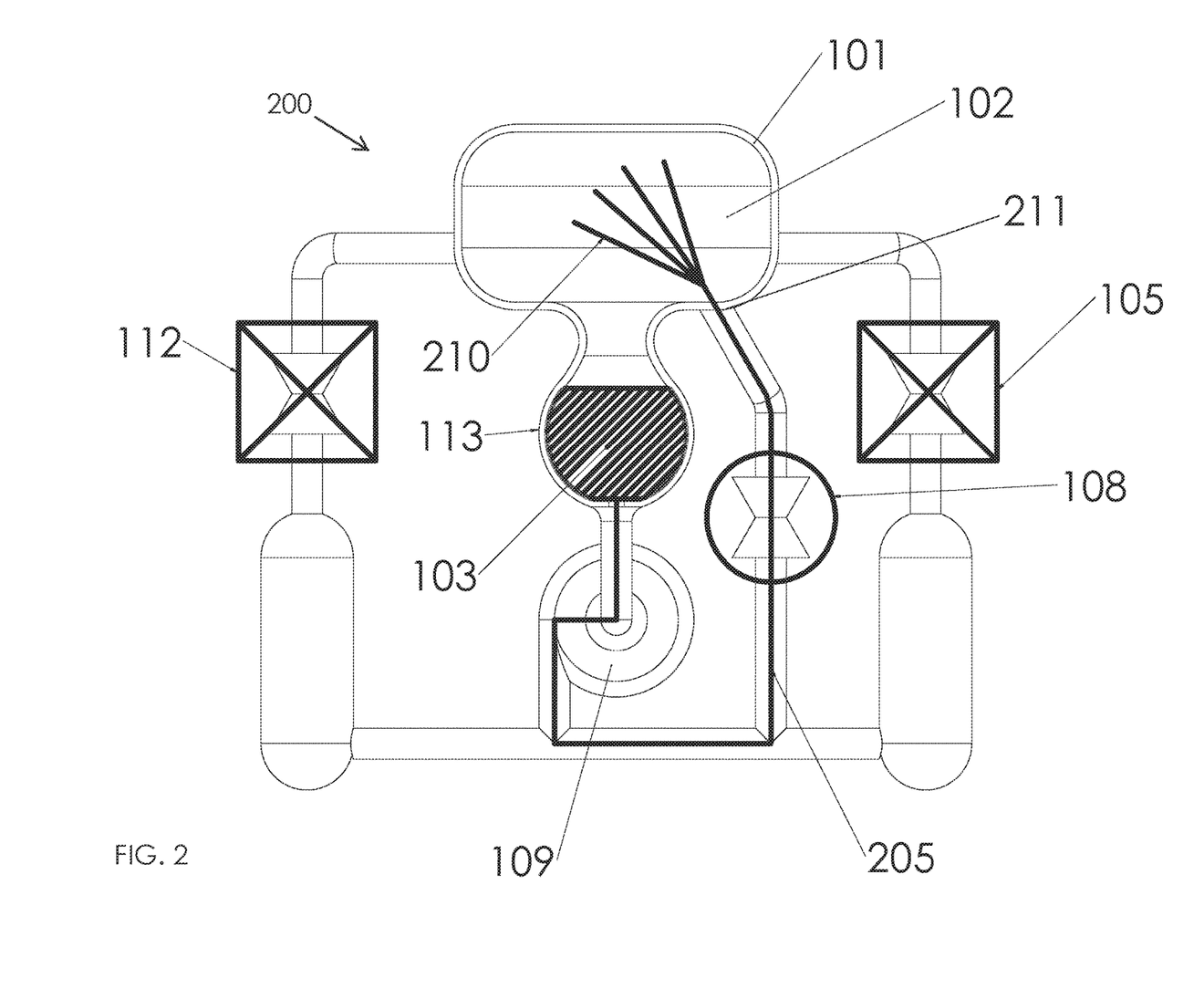
FIG. 2 is a schematic illustration of the spray-actuated system of FIG. 1 in an initial expansion phase.

It should be appreciated that "median" temperature fluid does not have to be exactly the average of the highest and lowest temperature heat transfer fluid, but instead is between those two. In a particular embodiment the median or medium temperature may be the average of the highest and lowest temperature heat transfer fluids. It should be recognized, however, that in practice some natural variability in temperatures and pressures may occur. It should also be appreciated that there may be some natural temperature loss or gain from the time heat transfer fluid has flowed through the heat source or cold source, respectfully, to the point at which the heat transfer fluid is sprayed into the chamber. Moreover, in an alternative arrangement a system may be arranged without a specific or separate passage or piping for medium temperature HTF, and instead operate by combining or mixing fluid delivered by both the high temperature HTF passage 104 and the low temperature HTF passage 111.

Figure 3:
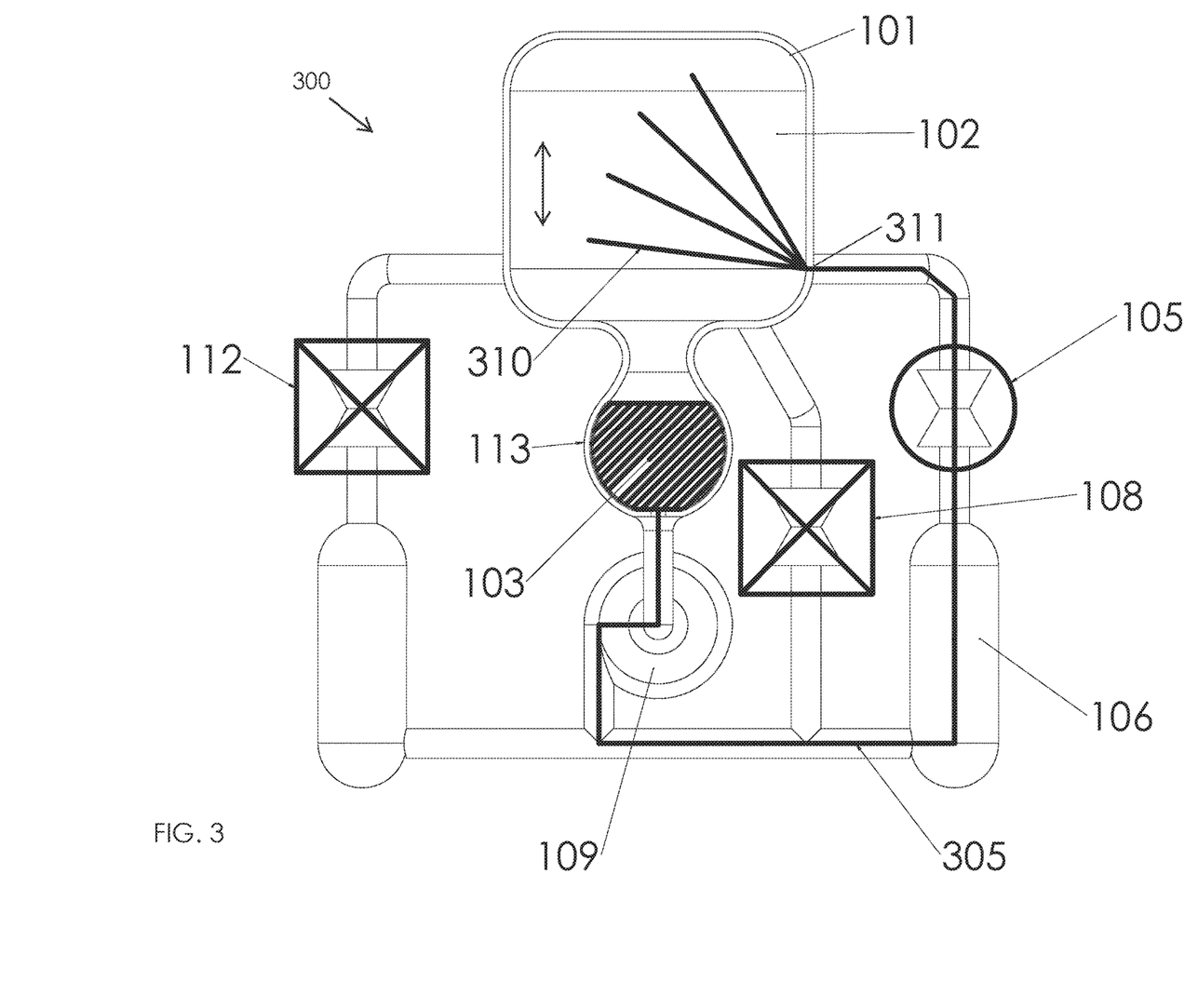
FIG. 3 is a schematic illustration of the spray-actuated system of FIG. 1 in a continued expansion phase relative to FIG. 2.

Once initial expansion 200 of FIG. 2 is complete, continued expansion 300 follows in accordance with FIG. 3. The medium-temperature spray 210 has been stopped. The medium-temperature heat transfer fluid control 108 has been closed, the cold heat transfer fluid control 112 remains closed and the high-temperature heat transfer fluid control 105 has opened. The medium-temperature heat transfer fluid 103 in the reservoir 113 is still being pumped by pump 109, but it is now delivered along pathway 305 through the heat source 106, raising its temperature. The now high-temperature heat transfer fluid 103 is sprayed 310 by a sprayer 311 into expandable volume 101 which begins raising the temperature and pressure of the operating gas 102, forcing additional expansion of the expandable volume 101. The high-temperature heat transfer fluid 103 spray 310 may be controlled such that the operating gas 102 is kept at the desired temperature throughout this phase of expansion.

Figure 4:
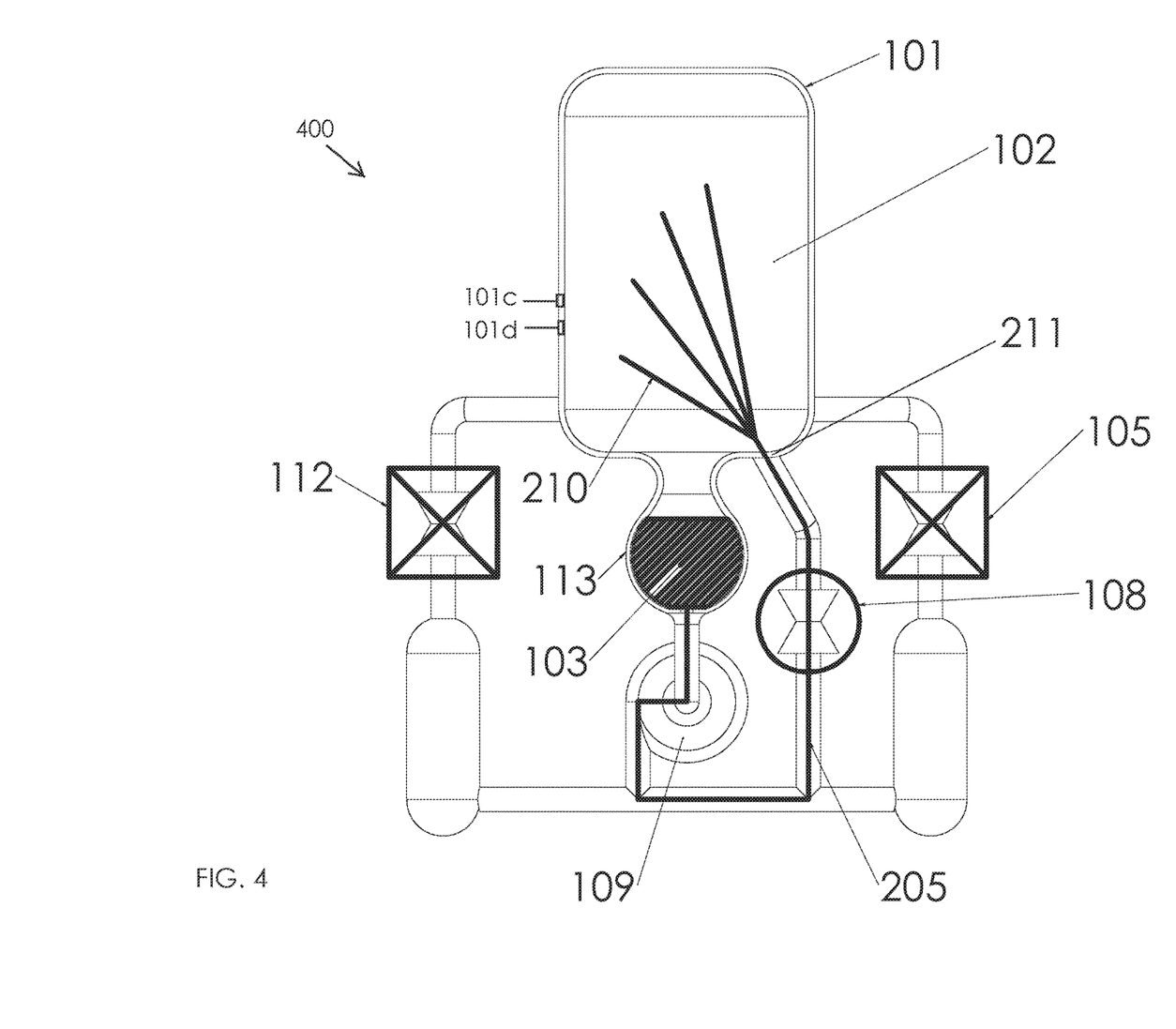
FIG. 4 is a schematic illustration of the spray-actuated system of FIG. 1 in an initial contraction phase relative to FIG. 3.

Once the expandable volume 101 has attained its maximum volume in accordance with FIG. 3, initial contraction 400 follows in accordance with FIG. 4. The high-temperature heat transfer fluid control 105 is closed, stopping the high-temperature spray 310. The cold heat transfer fluid control 112 remains closed. The medium-temperature heat transfer fluid 103 in the reservoir 113 is still being pumped by pump 109. The pathway 205 is opened again by the control 108 so medium-temperature heat transfer fluid 103 is sprayed 210 by the sprayer 211 into the expandable volume 101, causing the operating gas 102 to reduce in temperature, reducing its pressure and causing the expandable volume 101 to begin contraction. The medium-temperature heat transfer fluid 103 is sprayed 210 such that the operating gas 102 maintains the desired temperature. It should be appreciated that the providing of heat transfer fluid under the various conditions and controls as discussed herein may be provided under control of controller 100b. A temperature monitoring sensor 101c (FIG. 4) may be provided such as may be coupled to controller 100b, and may be used for spraying and maintaining the temperature. Alternatively, the process may be preset to operate at certain temperature levels, timings and/or spray volumes to thereby provide a controlled operation. Likewise, a pressure monitoring sensor 101d (FIG. 4) may likewise be provided and coupled to controller 100b.

Figure 5:
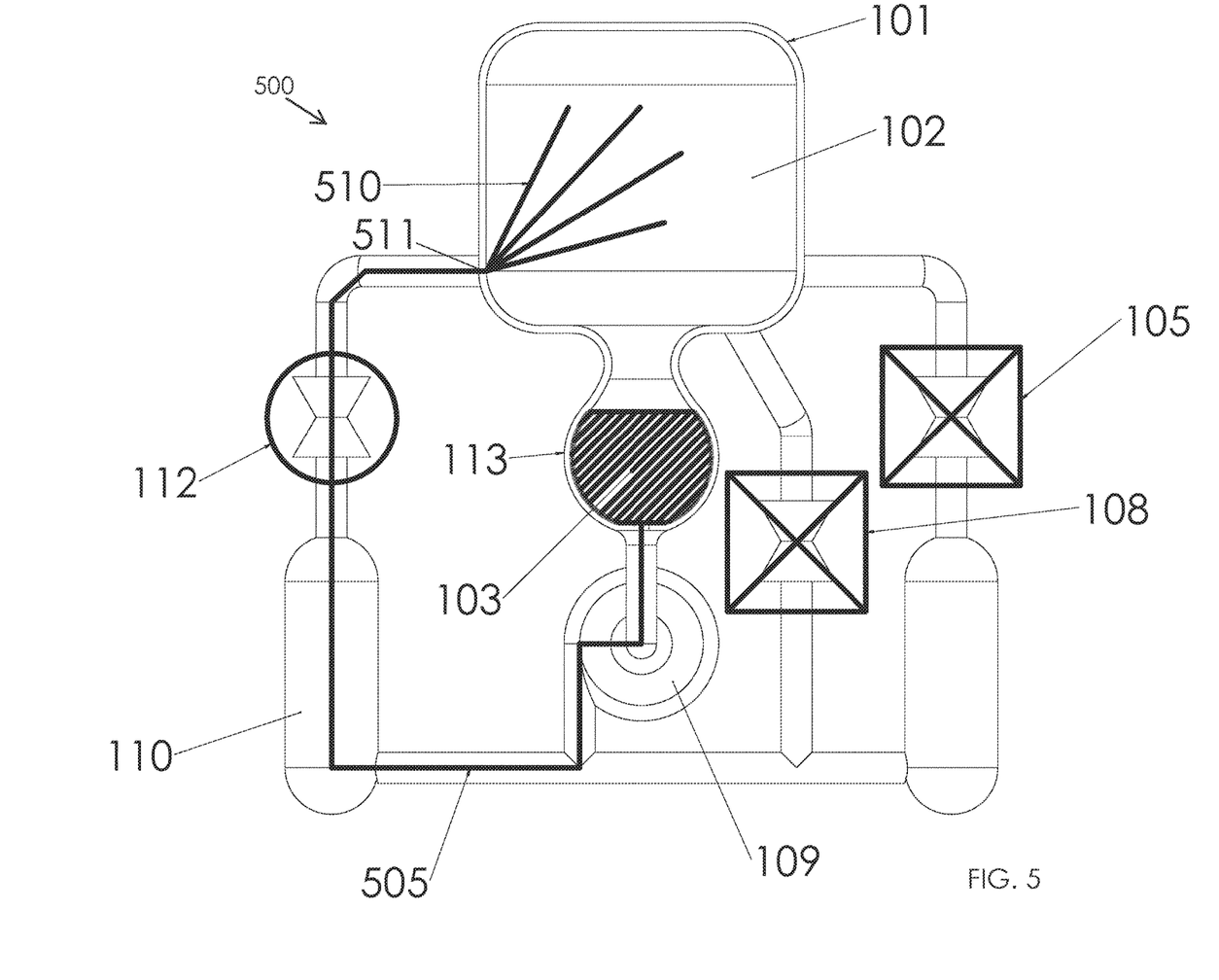
FIG. 5 is a schematic illustration of the spray-actuated system of FIG. 1 in a final contraction phase relative to FIG. 4.

With reference to FIG. 5, during final contraction 500 the medium-temperature heat transfer fluid control 108 is closed and the low-temperature heat transfer fluid control 112 opens. The medium-temperature heat transfer fluid 113 is then pumped by pump 109 through the cold location 110, where its temperature is lowered i.e. heat is rejected. Low-temperature heat transfer fluid spray 510 begins via sprayer 511, causing the temperature of the operating gas 102 to fall further to its lowest level and continuing contraction. The low-temperature heat transfer fluid spray 510 is controlled in such a way as to maintain the desired temperature in the operating gas 102 during continued contraction. This controlled operation may be obtained by similar operation as noted above and may involve maintaining a generally constant temperature. When the expandable volume 101 has contracted back to its minimum volume, the cycle is complete.

During each spray operation, the heat transfer fluid 103 that would accumulate in the expandable volume 101 is drained into the reservoir 113. There all three temperatures of heat transfer fluid 103 mix, forming the medium-temperature heat transfer fluid 103 that is twice sprayed into the expandable volume 101 and piped through hot zone 106 and cold zone 110. This addition and rejection of energy at those locations is thermodynamically required of any heat engine.

The spray-actuated system of the present invention provides several advantages over current mechanical Stirling Cycle engines. For example, Stirling engines require an operating gas pumped between the heat transfer zones and through the heat exchange method to both transfer heat energy between the temperature zones and motivate the mechanical means of producing power. Pumping gases which are compressible is less efficient than pumping liquids. Another difficulty for Stirling engines involves the choice of the gas itself: hydrogen is thermodynamically the best for making power, but is extremely difficult to keep from leaking and is quite flammable. Helium is nonflammable and nearly as good for heat transfer, but is expensive. In the illustrated embodiment, the spray-actuated system 100 produces useful power utilizing air as the operating fluid 102, although alternative gasses may be employed.

Transferring heat to and from gases by convection is much slower than moving heat in and out of a liquid by conduction. This is not necessarily a matter of efficiency, but the heat transfer rate relates directly to pressure rise rate, to torque versus operating speed and so to power production. The typical Stirling engine adds and subtracts energy from the operating gas at particular locations. At the hot and cold locations, the surface areas are dimensionally limited, reducing energy transfer to and from the gas. At the heat exchanger, the operating gas must be pumped through an arrangement of fins or wires or other modality with a limited heat transfer area, limiting heat transfer and impeding gas flow. The faster the Stirling engine operates, the less time there is for heat to enter or leave the operating gas, limiting power. The spray-actuated Stirling system may use any of a number of liquids including liquid metals which might be chosen for their ability to absorb and transfer heat in spray form. Being able to move a larger quantity of heat and at higher speed will result in greater power output. Energy transfer to and from the operating fluid occurs much more rapidly by spraying in the heat transfer fluid. Also, controlling the rate and duration of the spray into the operating fluid keeps its temperature controlled so that the Spray-Actuated Stirling System more nearly approximates the Ideal Stirling Cycle.

The spray-actuated system 100 torque production behavior is particularly valuable. Since the three different temperature spray operations are pump-actuated and independently controlled, the spray-actuated system 100 may be configured to produce maximum torque at zero rpm. The expandable volume expansion or contraction is easily reversed by changing the opening and closing order of the controls. Still further, the spray-actuated system 100, unlike the typical Stirling engine, is self-starting in either direction which means that it does not require a multiple-speed mechanical transmission.

To operate the spray-actuated system 100 as either an Ericsson or Brayton Cycle engine, it is necessary only to modify the timing and amount of the injection of heat transfer fluid 103 into the expandable volume 101.

Figure 6:
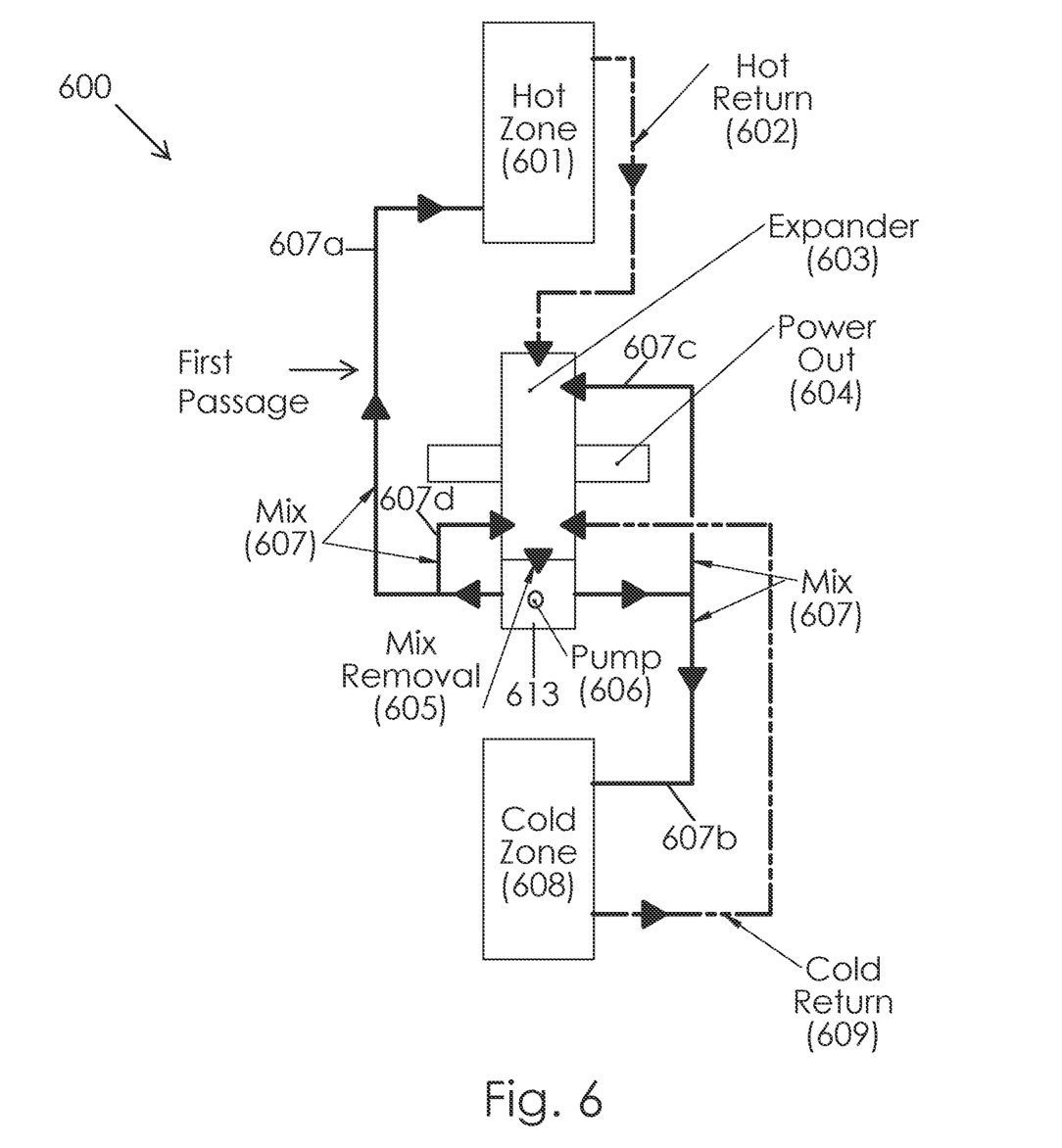
FIG. 6 is a schematic illustration of another spray-actuated system having a single expandable volume in accordance with an embodiment of the present invention.

Referring now to FIG. 6, a spray-actuated system 600 with a single expandable volume 603 is illustrated in schematic form configured for maximum efficiency with indicators or flow paths of heat transfer fluid HTF movement shown at 602, 605, 607, 609. HTF at its maximum temperature 602 is sprayed into the expandable volume 603 at the appropriate moment, where volume 603 may be a piston-cylinder arrangement, a rotary arrangement, or other such control volume configured to provide an output of power. Minimum temperature HTF 609 is sprayed in when called for. HTF is removed 605, such as via a valve or drain or the like, from the expandable volume 603 into reservoir 613 and pumped by a pump 606. As shown, the median temperature mixture 607 is split four ways. One portion 607a is directed to the hot zone 601 where it attains maximum temperature. One portion 607b is directed to the cold zone 608, where it is cooled to minimum temperature. One portion 607c is sprayed into the expandable volume 603 at the minimum volume position, in which case its medium temperature adds energy, and another portion 607d is sprayed in at the maximum volume position where it removes energy. This alternate use of the medium temperature HTF constitutes the heat regeneration function performed in standard Stirling and Ericsson Cycle systems. Any work that is produced is removed via a mechanism 604, such as a drive shaft or wheel, for example.

Figure 7:
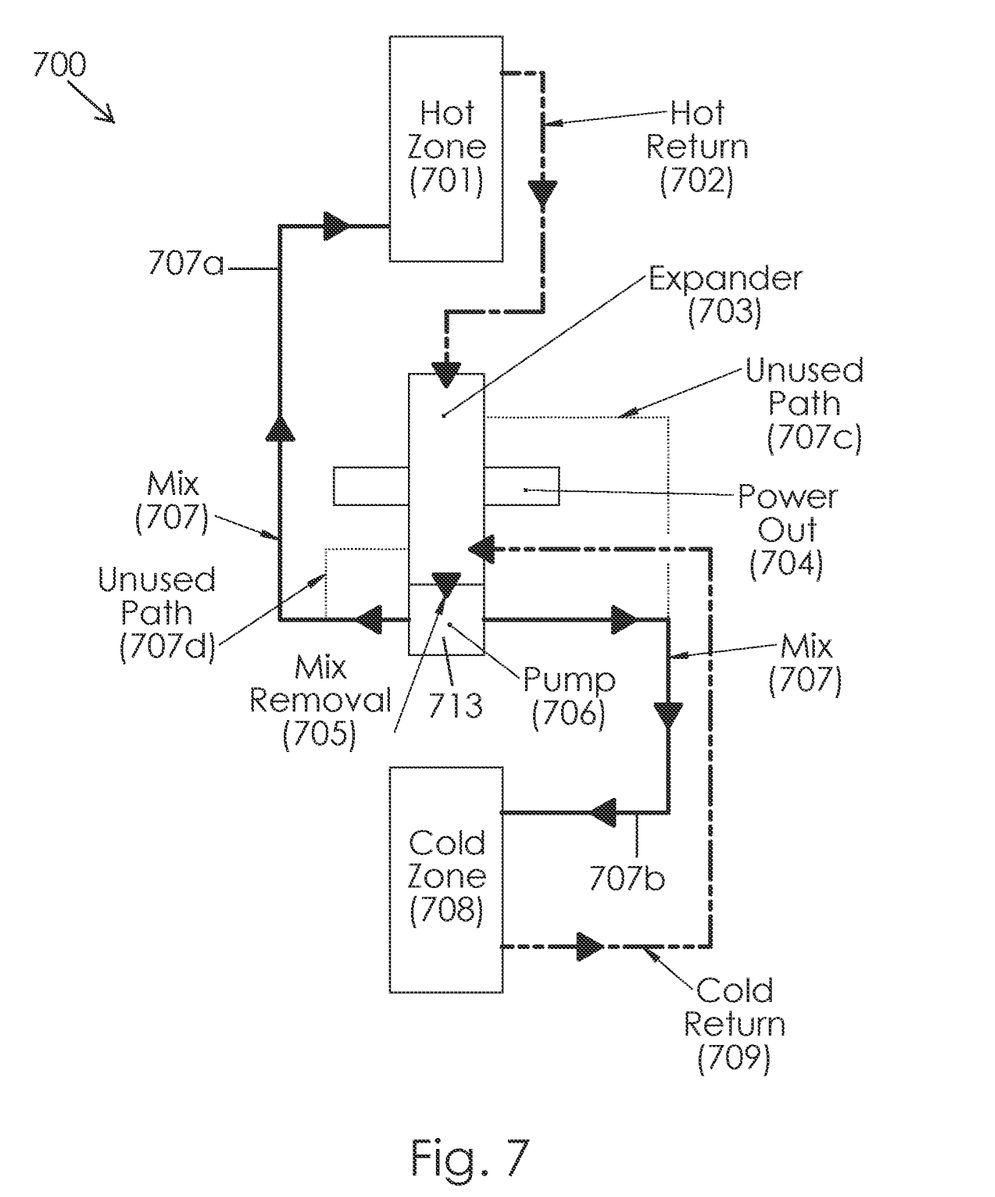
FIG. 7 is a schematic illustration of the spray-actuated system of FIG. 6 with an alternative flow-path of the median temperature mixture to provide maximum power.

Referring now to FIG. 7, a spray-actuated system 700 is illustrated that depicts a substantially similar mechanical arrangement as shown in FIG. 6, however, the median temperature mixture 707 is not returned, in part, to the expandable volume 703, but those pathways 707c, 707d are cut off mechanically causing operation at maximum power. Therefore, half of the mixture 707a is sent to the hot zone 701 and the other half 707b is sent to the cold zone 708. Since a greater amount of mixture 707 is heated and cooled, a greater amount of energy may be converted to work output 704. However, since no regeneration function is being performed, efficiency will be reduced. This arrangement demonstrates that the basic spray-actuated system has two modes of operation: high efficiency/low power, as in FIG. 6, and low efficiency/high power, as in FIG. 7, which would improve its practicality in real-world applications. It should be appreciated that similar components of system 700 relative to system 600 are identified with similar reference numerals, but with "100" added to the reference numerals of system 600. Due to the similarities not all features and items are discussed herein with regard to system 700.

Figure 8A:
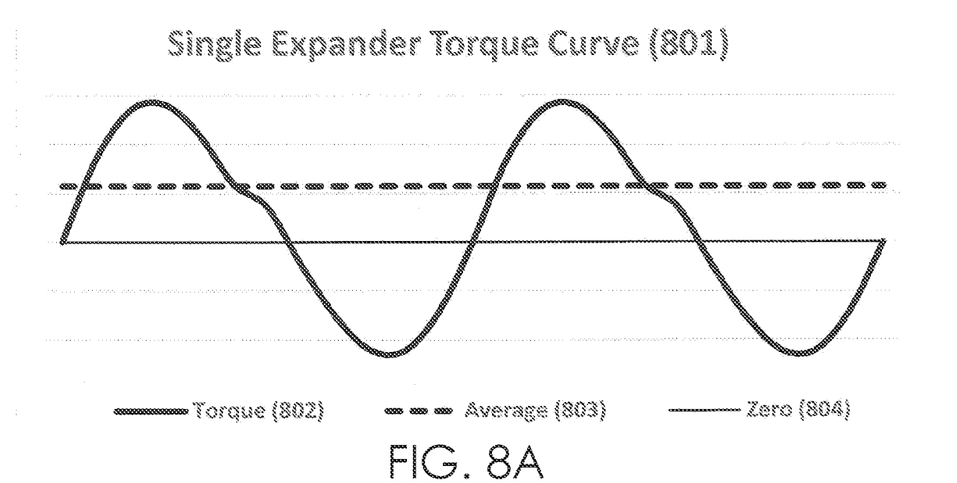
FIG. 8A is a projected torque output curve graph of a spray-actuated system having a single expander in accordance with the present invention.

With reference now to FIG. 8A, a graph of an embodiment with a single expander torque curve 801 shows the typical behavior of a mechanical system using spray actuation. Note that the torque 802 output is roughly sinusoidal and, though it is both positive and negative at various points, its average value 803 is greater than zero 804. It is important to note that, at various points in its functioning, the actual torque value 802 is negative, which would require some form of rotary momentum functionality, such as a flywheel, spring arrangement or high-speed operation with mechanism parts supplying momentum, for example.

Figure 8B:
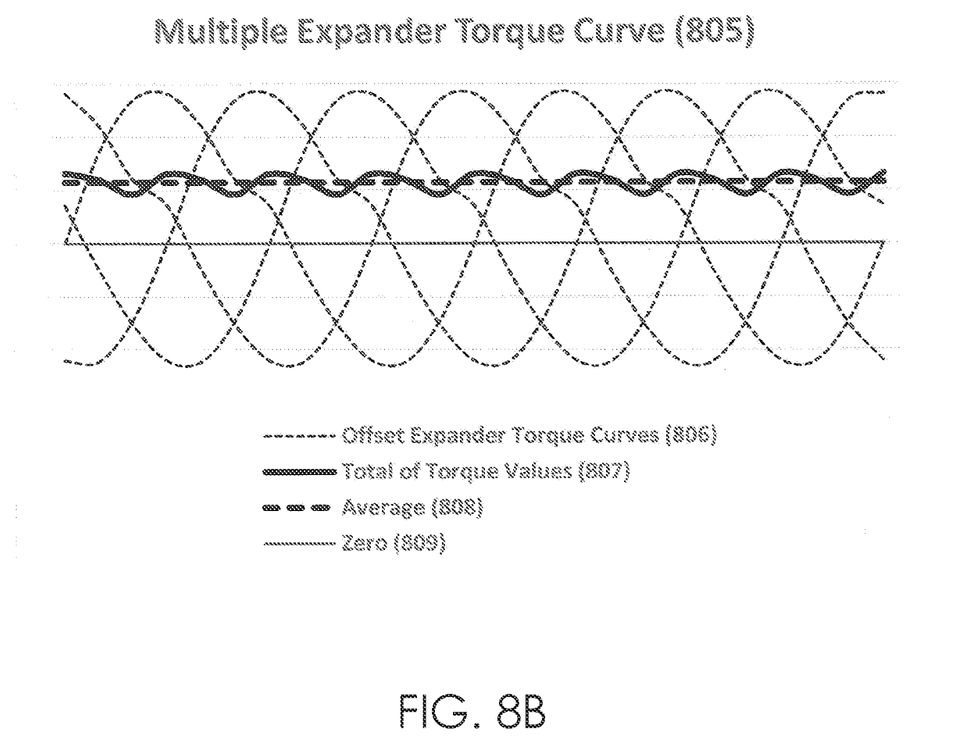
FIG. 8B is a projected torque output curve graph of a spray-actuated system having multiple expanders in accordance with the present invention.

Should low-speed operation be required without the use of additional equipment, however, this is accomplished by utilizing multiple expanders as illustrated by the torque curve 805 in FIG. 8B. Multiple expander embodiments are discussed below in reference to FIGS. 9 and 10. As shown in FIG. 8B, in the multiple expander torque curve graph 805 example, four expanders are mechanically linked and their operation timings offset such that their torque curves 806 balance out the negative portions, producing a total value cure 807 that is always positive and relatively close at every point to the average torque value 808.

Figure 9:
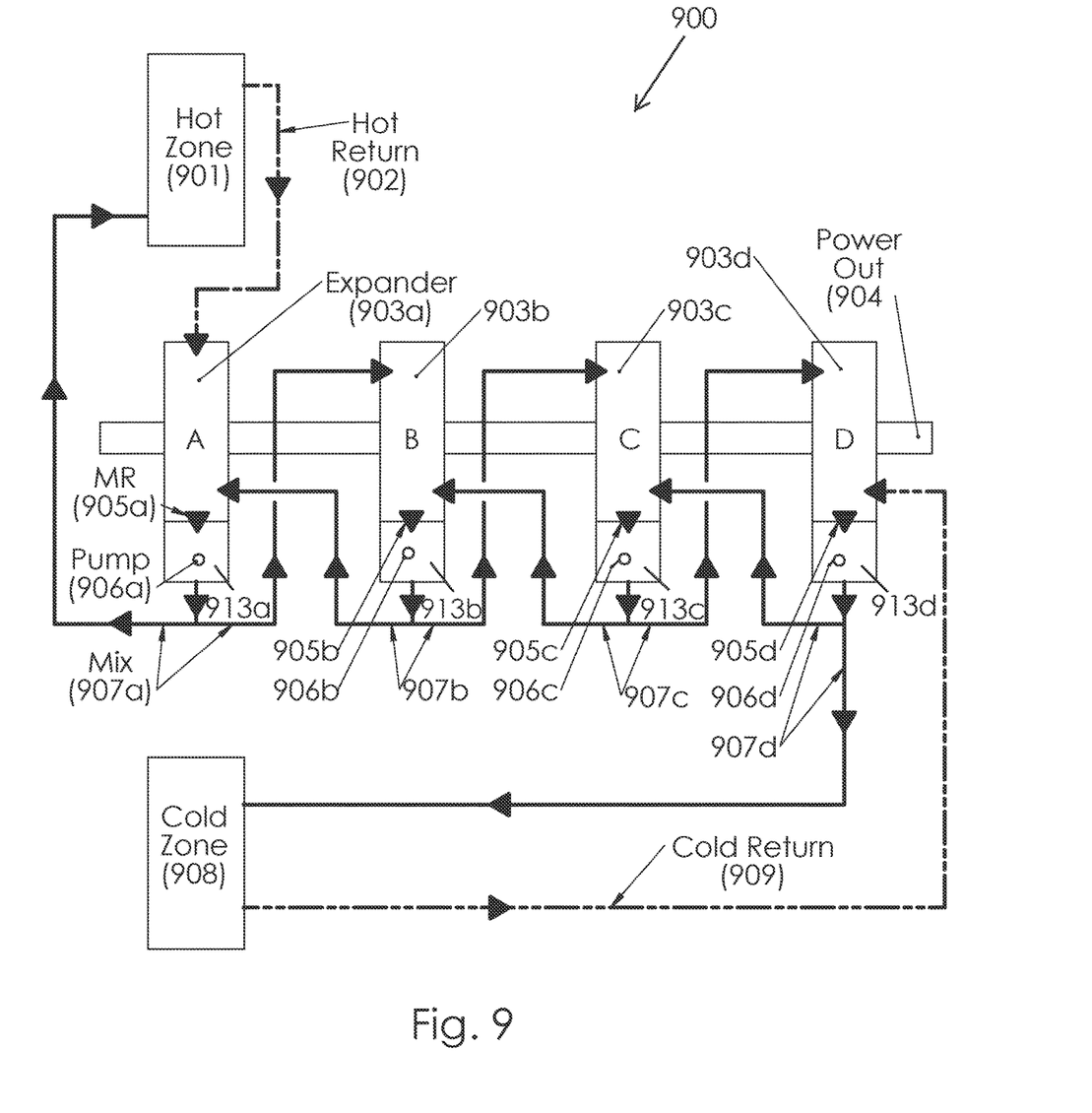
FIG. 9 is a schematic illustration of a spray-actuated system having multiple expanders in accordance with a further embodiment of the present invention operating in a maximum efficiency mode.

FIG. 9 illustrates an exemplary embodiment of a multi-expander spray-actuated system embodiment 900 that is configured to operate at maximum efficiency. While it would be possible to simply add multiple systems mechanically together like those shown in FIGS. 6 and 7, another arrangement of HTF supply may be utilized. In this example, four expandable volumes 903a, 903b, 903c, 903d are mechanically linked 904, such as to provide output power by a drive shaft or wheel, or the like. Each functional spray-actuated system group A, B, C, D has its own expander 903, mixture removal function 905, such as a drain or valve or the like, to a reservoir 913 and a pump 906. Although not shown, system 900 may likewise include valve mechanisms and/or a controller as illustrated in the embodiment of FIG. 1. During operation, the maximum temperature HTF 902 is supplied only to expander 903a. When the moment for injection of cooler HTF arrives, half of the mixture 907b from expander 903b is pumped into expander 903a and the other half to expander 903c. The mixture 907a from expander 903a is pumped by pump 906a and split: half returns to the hot zone 901 and half is utilized by expander 903b as its hot mixture. In the same manner, subsequent expanders 903c and 903d also make use of left-side expander mixtures as their hot HTF supplies and right-side mixtures as their cold HTF supplies. The last expander 903d uses mixture 907c as its hot HTF and sends half of its mixture 907d to cool heat expander 903c and the other half 907d to the cold zone 908, with the cold return 909 being supplied as the cold mixture to expander 903d. This sharing of warm and cool mixture between expanders 903a, 903b, 903c, 903d constitutes the regeneration function, leading to maximum efficiency. FIG. 9 thus illustrates that expanders 903b and 903c (i) receive medium temperature mixture from an adjacent upstream expander as a high temperature input, (ii) output its own medium temperature mixture to that adjacent upstream expander as a lower temperature input and to a downstream adjacent expander as a higher temperature input, and also (iii) receive medium temperature mixture output from that downstream adjacent expander as a lower temperature input. It should be appreciated that the term adjacent as used herein does not require, but can include, physical proximity.

Figure 10:
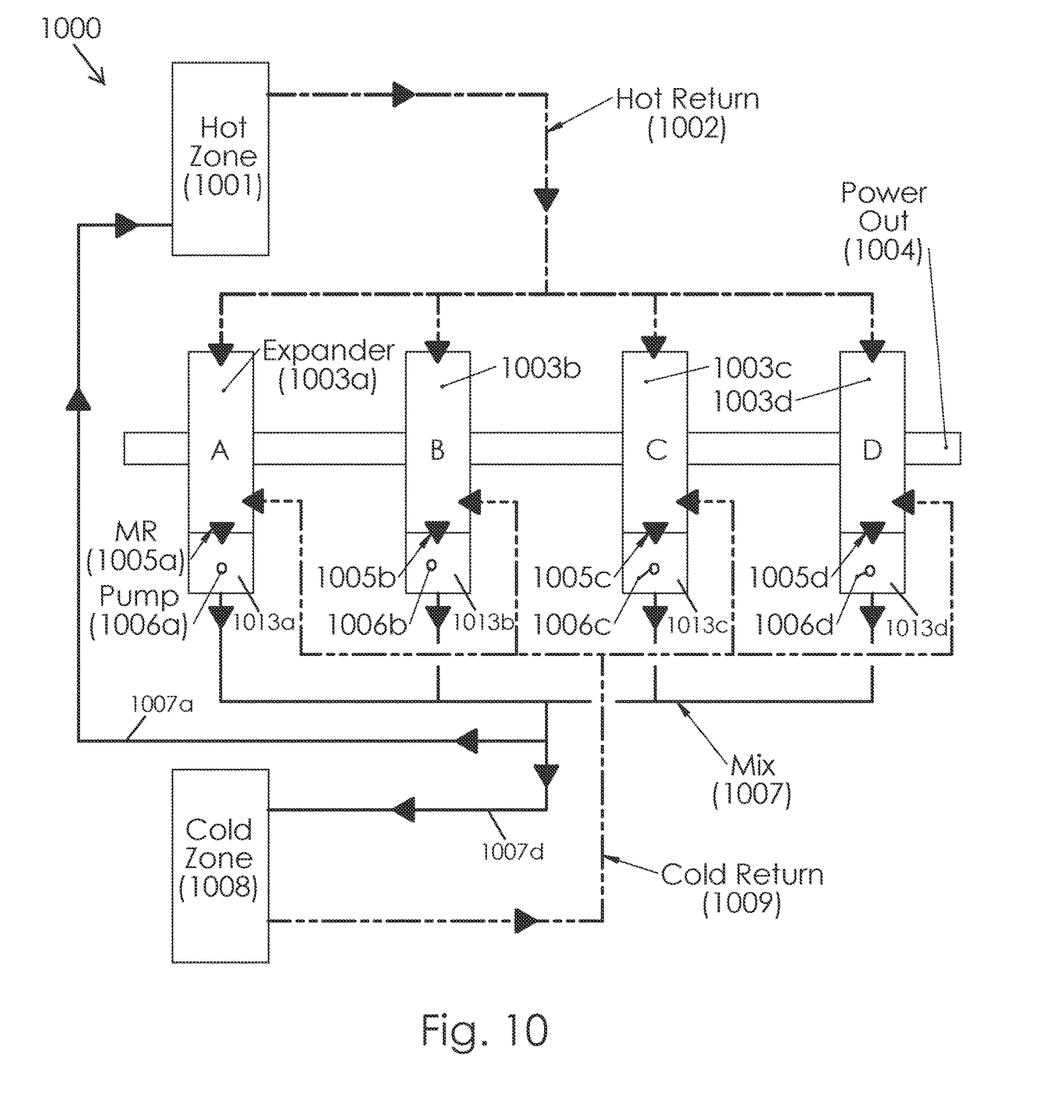
FIG. 10 is a schematic illustration of the spray-actuated system of FIG. 9 operating in a maximum power mode.

Referring now to FIG. 10, a multi expander spray-actuated system 1000 is illustrated that in the same manner that FIG. 7 is configured for maximum power HTF utilization, with FIG. 10 depicting the same functionality for a multiple expander arrangement. In the embodiment of FIG. 10, rather than sharing mixture between the expanders 1003a, 1003b, 1003c, 1003d, in the manner of system 900, each expander 1003a, 1003b, 1003c, 1003d equally receives hot HTF 1002 and cold HTF 1009. Since the maximum temperature difference HTF is injected into all the expanders 1003a, 1003b, 1003c, 1003d, maximum work output 1004 is achieved, but at a lower efficiency. It should be appreciated that similar components of system 1000 relative to system 900 are identified with similar reference numerals, but with "100" added to the reference numerals of system 900. Due to the similarities not all features and items are discussed herein with regard to system 1000.

The spray-actuated systems in accordance with the present invention may provide useful power when integrated with a wide variety of systems. For example, the heat source may be waste heat generated by a power generating process, such as a coal fired power plant or nuclear power plant. Likewise, the cold source may be associated with or coupled for heat transfer with a body of water. It should be appreciated that the operation of any of the above discussed embodiments includes controlling the rate and/or duration of delivery or spraying into an expandable volume to maintain a generally constant temperature of the operating fluid during expansion and/or contraction, such as consistent with the designated operating thermodynamic cycle. Still further, it should be noted that embodiments may be constructed in accordance with the present invention in which valves or other means of injection control are not required. This includes, for example, embodiments in which heat transfer fluid may be continuously sprayed into the expandable volume, such as at various locations, rather than at different times in the operating cycle. This may include, for example, systems in which the expandable volume, such as a piston-cylinder arrangement or a rotary arrangement selectively receive the sprayed in heat transfer fluid depending on the position of a moving element, such as a piston or rotor. In a rotary embodiment, for example, certain locations may be subject to compression or expansion based on the the volume swept by the rotor. Heat transfer fluid of a desired temperature, such as high and low, and optionally medium as well, may be continuously sprayed into particular locations of the chamber to operate in the manner as set forth in the embodiments above.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A spray-actuated heat engine, comprising:
   a chamber, said chamber comprising an expandable volume containing an operating fluid in a gas form;
   a reservoir configured to hold a heat transfer fluid in a liquid form;
   a pump configured to pump the heat transfer fluid from the reservoir to the chamber; and
   a piping system through which the heat transfer fluid is configured to flow;
   wherein the piping system is in fluid communication with a heat source configured to heat the heat transfer fluid to obtain a high temperature when flowing at the heat source, and wherein the piping system is in fluid communication with a cold source configured to remove heat from the heat transfer fluid to obtain a low temperature when flowing at the could source;
   wherein heat transfer fluid at the high temperature is selectively sprayed into the expandable volume to mix with the operating fluid therein to selectively expand the operating fluid, and wherein heat transfer fluid at the low temperature is selectively sprayed into the expandable volume to mix with the operating fluid therein to selectively contract the operating fluid.

2. The spray-actuated heat engine of claim 1, wherein the piping system is configured to provide heat transfer fluid at a median temperature to the heat source to obtain the high temperature heat transfer fluid, and wherein the piping system is configured to provide heat transfer fluid at the median temperature to the cold source to obtain the cold temperature heat transfer fluid.

3. The spray-actuated heat engine of claim 1, further comprising an output drive mechanically coupled to the chamber, and wherein the output drive is driven by selective expansion and contraction of the operating fluid.

4. The spray-actuated heat engine of claim 1, further comprising a spray system for use in spraying the heat transfer fluid into the chamber, and wherein the spray system atomizes the heat transfer fluid when spraying into the chamber.

5. The spray-actuated heat engine of claim 1, wherein the reservoir is in fluid communication with the chamber, and wherein heat transfer fluid that is sprayed into the chamber subsequently collects into the reservoir.

6. The spray-actuated heat engine of claim 1, further comprising a plurality of fluid flow controls coupled to the piping system, and wherein the fluid flow controls are operable to selectively inhibit or enable flow through the piping system.

7. The spray-actuated heat engine of claim 1, wherein heat transfer fluid at a median temperature between the high temperature and the low temperature is selectively sprayed into the expandable volume to mix with the operating fluid therein to selectively expand and contract the operating fluid, wherein heat transfer fluid at the median temperature is first sprayed into the expandable volume to initiate expansion of the operating fluid and then heat transfer fluid at the high temperature is sprayed into the expandable volume to continue expansion of the operating fluid, and wherein heat transfer fluid at the median temperature is first sprayed into the expandable volume to initiate contraction of the operating fluid and then heat transfer fluid at the low temperature is sprayed into the expandable volume to continue contraction of the operating fluid.

8. The spray-actuated heat engine of claim 7, wherein the piping system comprises a hot passage in fluid communication with the heat source, a cold passage in fluid communication with the cold source, and a median temperature passage through which heat transfer fluid at the median temperature flows.

9. A spray-actuated heat engine, comprising:
a plurality of chambers comprising at least a first chamber and a last chamber, each said chamber comprising an expandable volume containing an operating fluid in the form of a gas;
a heat transfer fluid in the form of a liquid;
a heat source configured to heat the heat transfer fluid and a cold source configured to extract heat from the heat transfer fluid;
wherein the heat transfer fluid is configured to be selectively sprayed into the expandable volumes of the chambers at different temperatures to mix with the operating fluids therein to selectively expand and contract the operating fluids.

10. The spray-actuated heat engine of claim 9, wherein heat transfer fluid at a first chamber median temperature is output from the first chamber with a portion being delivered to the heat source to be heated and at least a portion subsequently delivered and sprayed into at least the first chamber; wherein heat transfer fluid at a last chamber median temperature is output from the last chamber with a portion being delivered to the cold source to extract heat from the heat transfer fluid and at least a portion subsequently delivered and sprayed into at least the last chamber.

11. The spray-actuated heat engine of claim 9, further comprising a piping system for delivery of heat transfer fluid between the chambers, the heat source and the cold source.

12. The spray-actuated heat engine of claim 9, further comprising a plurality of reservoirs and a plurality of pumps, wherein each chamber is in fluid communication with one of the reservoirs, and wherein each of the chambers is operably connected with at least one of the pumps to move heat transfer fluid to and/or from the chamber.

13. The spray-actuated heat engine of claim 9, further comprising at least one output drive mechanically coupled to each of the chambers, and wherein the at least one output drive is driven by selective expansion and contraction of the operating fluids within the chambers.

14. The spray-actuated heat engine of claim 9, wherein each chamber discharges a respective median temperature heat transfer fluid, and wherein a portion of the discharged median temperature heat transfer fluid is delivered to the heat source to be heated to obtain a high temperature heat transfer fluid, and wherein a portion of the discharged median temperature heat transfer fluid is delivered to the cold source to extract heat and obtain a low temperature heat transfer fluid;
wherein heat transfer fluid at the high temperature is selectively sprayed into the expandable volumes of the chambers to mix with the operating fluids therein to selectively expand the operating fluids; and
wherein heat transfer fluid at the low temperature is selectively sprayed into the expandable volumes to mix with the operating fluids therein to selectively contract the operating fluids.

15. The spray-actuated heat engine of claim 14, wherein the portion of the discharged median temperature heat transfer fluid delivered to the heat source comprises a portion of the discharged median temperature heat transfer fluid from each chamber, and wherein the portion of the discharged median temperature heat transfer fluid delivered to the could source comprises a portion of the discharged median temperature heat transfer fluid from each chamber.

16. The spray-actuated heat engine of claim 9, wherein heat transfer fluid at a first median temperature is output from the first chamber with a portion being delivered to the heat source to be heated and subsequently delivered and sprayed into the first chamber, and with a portion being delivered and sprayed into a downstream chamber adjacent to the first chamber;
wherein heat transfer fluid at a last median temperature is output from the last chamber with a portion being delivered to a cold source for removal of heat and subsequently delivered and sprayed into the last chamber, and with a portion being delivered and sprayed into an upstream chamber adjacent to the last chamber.

17. The spray-actuated heat engine of claim 16, wherein the downstream chamber comprises the last chamber, and wherein the upstream chamber comprises the first chamber.

18. The spray-actuated heat engine of claim 16, comprising at least one additional chamber, and wherein median temperature heat transfer fluid from both an upstream chamber and a downstream chamber is selectively delivered and sprayed into the additional chamber and wherein a portion of the median temperature heat transfer fluid from the additional chamber is selectively delivered and sprayed into the upstream chamber and a portion of the median temperature heat transfer fluid from the additional chamber is selectively delivered and sprayed into the downstream chamber.

19. A method of generating power using a spray-actuated heat engine and a heat transfer fluid, said method comprising:
moving heat transfer fluid as a liquid by a heat source to reach a high temperature; and
moving heat transfer fluid as a liquid by a cold source to reach a low temperature;
spraying heat transfer fluid at the high temperature into an expandable volume containing an operating fluid to cause the operating fluid to expand; and
spraying heat transfer fluid at the low temperature into the expandable volume to cause the operating fluid to contract;
wherein the high temperature is higher than the low temperature.

20. The method of claim 19, further comprising a plurality of expandable volumes that each include an operating fluid, and wherein said spraying heat transfer fluid at the high temperature comprises spraying heat transfer fluid at the high temperature into each of the expandable volumes to cause the respective operating fluid to expand, and wherein said spraying heat transfer fluid at the low temperature comprises spraying heat transfer fluid at the low temperature into each of the expandable volumes to cause the respective operating fluid to contract.

21. The method of claim 19, further comprising at least one output drive mechanically coupled to the expandable volume, and wherein the at least one output drive is driven by selective expansion and contraction of the operating fluid within the expandable volume, and/or wherein the operating fluid within the expandable volume comprises a single gas or a mixture of gases.

22. The method of claim 19, further comprising either continuously spraying heat transfer fluid at the high temperature and heat transfer fluid at the low temperature into the expandable volume, or selectively spraying heat transfer fluid at the high temperature and heat transfer fluid at the low temperature into the expandable volume at various times.

23. The method of claim 19, further comprising:
initially spraying heat transfer fluid at a between temperature between the high temperature and the low temperature into the expandable volume to cause the operating fluid to expand when the operating fluid is at a temperature below the between temperature prior to said spraying heat transfer fluid at the high temperature; and/or initially spraying heat transfer fluid at the between temperature into the expandable volume to cause the operating fluid to contract when the operating fluid is at a temperature above the between temperature prior to said spraying heat transfer fluid at the low temperature.

24. The method of claim 23, further comprising a plurality of expandable volumes that each include an operating fluid, and wherein each expandable volume receives a different temperature high temperature heat transfer fluid, low temperature heat transfer fluid and between temperature heat transfer fluid, and wherein the plurality of expandable volumes comprises at least a first expandable volume and a last expandable volume.

25. The method of claim 24, further comprising at least one expandable volume disposed in fluid communication between the first expandable volume and the last expandable volume, and wherein the method further comprises:

spraying into the at least one expandable volume heat transfer fluid at its high temperature from a between temperature output of an upstream adjacent expandable volume;

outputting a between temperature heat transfer fluid from the at least one expandable volume (i) as the low temperature heat transfer fluid sprayed into an upstream adjacent expandable volume, and (ii) as the high temperature heat transfer fluid sprayed into a downstream adjacent expandable volume; and spraying into the at least one expandable volume heat transfer fluid at its low temperature from a between temperature output of the downstream adjacent expandable volume.

* * * * *